M. HAYMAN.
DOUGH MOLDING MACHINE.
APPLICATION FILED MAR. 26, 1913.

1,101,074.   Patented June 23, 1914.

WITNESSES:
Arthur Hayman
Robert Richter

INVENTOR
Morris Hayman
BY F. Warren Wright
ATTORNEY.

UNITED STATES PATENT OFFICE.

MORRIS HAYMAN, OF NEW YORK, N. Y.

DOUGH-MOLDING MACHINE.

1,101,074.   Specification of Letters Patent.   Patented June 23, 1914.

Application filed March 26, 1913. Serial No. 756,841.

*To all whom it may concern:*

Be it known that I, MORRIS HAYMAN, a citizen of the United States, residing at New York city, in the county and State of New York, have invented certain new and useful Improvements in Dough-Molding Machines, of which the following is a clear, full, and exact description.

This invention relates to apparatus for cutting out a formation of dough from a mass, so that it may be transported to a rising table or a baking pan.

The object is to provide a machine which will operate accurately, and produce uniform rolls, bread or cake, as the case may be.

In carrying out the invention, I provide a carriage provided with a multitude of depending two-part molds from its under side, the two-part molds having operative mechanism in the carriage body to cause them to be operated simultaneously, to bite into the dough uniformly, and to retain the dough so that on lifting the carriage and moving it away a multitude of dough units all of similar shape, and size to their molds, may be with one operation placed upon a rising board or the like. In the specific embodiment of my invention shown, the molds each consist of two hemispherical parts pivoted near their vertical diameter to supporting rods on the carriage. Each mold is provided with lugs, to which curved connecting links are attached, the other end of the connecting links being pivoted to a gear wheel, all gear wheels of all the molds being properly meshed, so that a single operating motor or hand wheel can simultaneously open or close the two-part molds. When open, the carriage and molds by the weight of the device will drop on to the bed of dough, the lower ends of the molds resting on the dough cause the dough to enter between the two hemispherical parts so that the operator may close all of the molds while in such position; then by lifting chain or the like, move the carriage off the dough and over the rising table or baking pan, where the molds may be released, dropping the dough in position for the next operation of the baker.

The scope of my invention will be pointed out in the claims.

Figure 1:
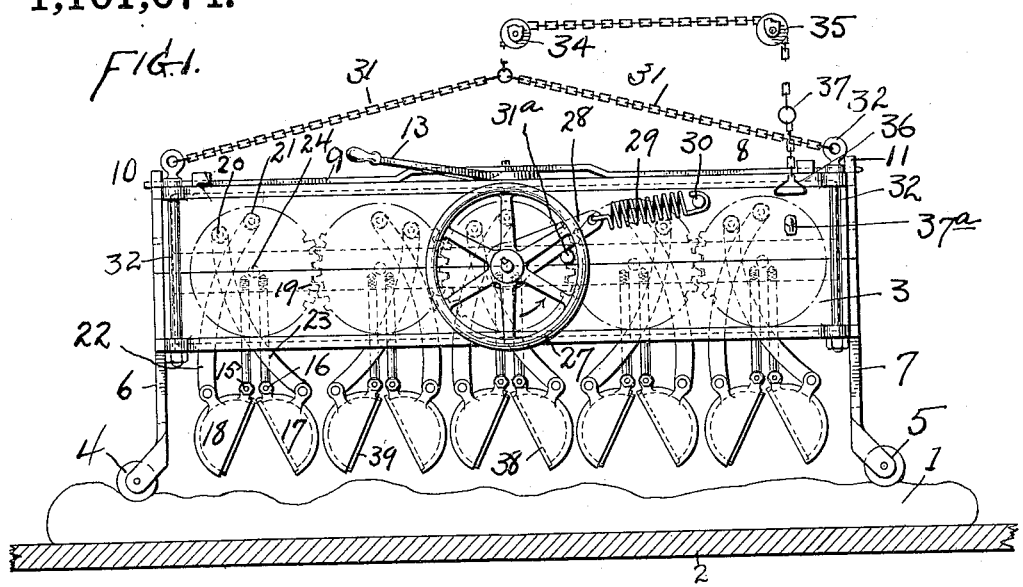
Figure 2:
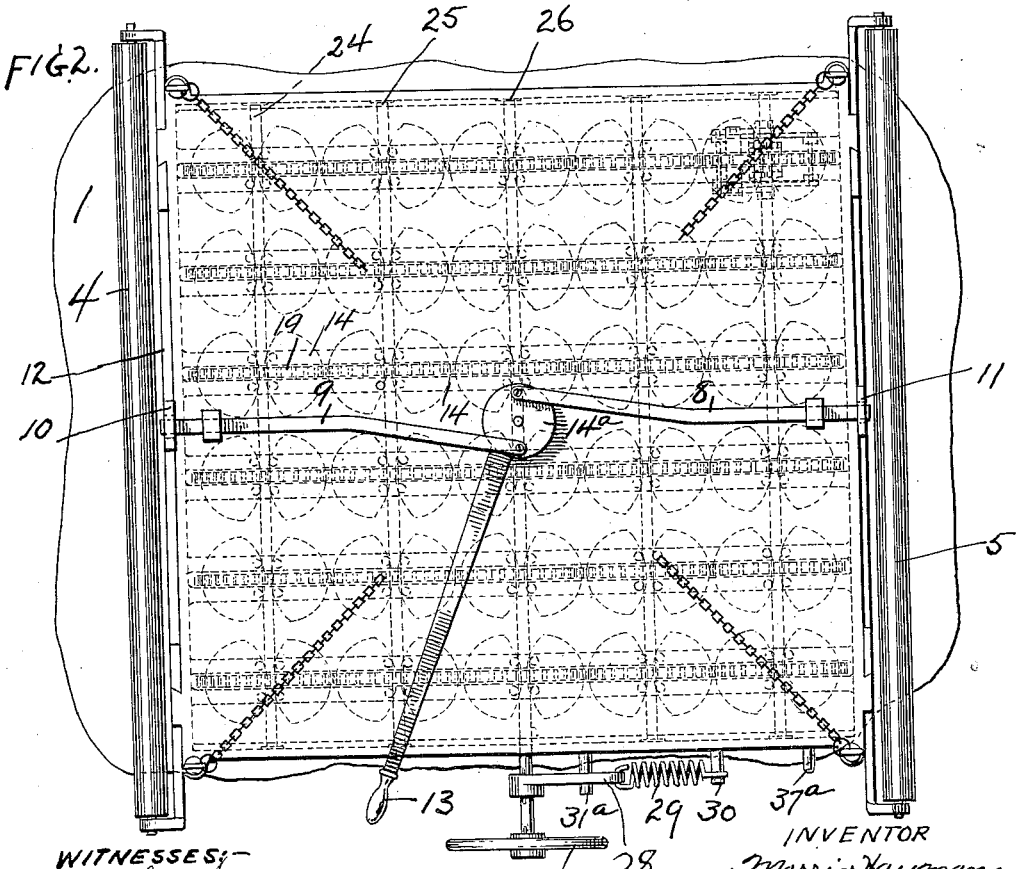

As shown in the accompanying drawings: Figure 1 is a side elevation of my improved device. Fig. 2 is a plan view of the same with the chains shown broken away.

The dough 1 is placed on a mold board 2, and either first rolled out into the shape shown in Fig. 1 by any desired means, or the carriage 3 may be provided as shown with a pair of rollers 4 or 5 supported in vertical supports 6 and 7, which at this time may be locked in the position shown by bolts 8 and 9 entering bolt holes 10 and 11 in transfer rods 12, forming part of the supporting legs 6 and 7. A lever 13 secured to a disk 14$^a$, to which both levers 8 and 9 are also pivoted, serves to withdraw the bolts or lock the same in place. When locked in place in the position of Fig. 1 the weight of the entire carriage will rest upon the rollers so that on moving the heavy machine backward and forward the dough will be flattened out effectively. When this has been accomplished the lever 13 will be thrown to unbolt the bolts and permit the carriage and its molds to drop on to the dough. The carriage 3 is provided with parallel transfer rolls 14, into which there are secured a number of depending studs 15, each stud below the carriage being pivoted to lugs 16 near the diameter of the hemispherical molds 17 and 18. Between two adjacent rolls 14 there is mounted for each two-part mold a gear wheel 19 provided with crank studs 20 and 21. Connecting levers 22 and 23, which are bent around the shaft 24, on which the gear is mounted, serve to connect the studs 20 and 21 with the lugs 15 and 16 on the molds. Each set of molds in a line may be on the same shaft 24, but each provided with its own gear. Other parallel shafts 25 are arranged across the machine at right angles to the rolls 14, and at such a distance apart that the gear wheels on one shaft will mesh with the gear wheels on each adjoining shaft, so that all gear wheels will turn in unison with shaft 26, which is a central shaft, and to which its gears are secured. A hand wheel 27 on a central shaft 26 serves to operate the molds to close them when the wheel is turned in the direction of the arrow in Fig. 1. A lever 28 fast on the shaft 26 is connected by a spring 29 with a stud 30 on the carriage frame against the tension of which spring the molds may be closed by the hand wheel, and when so closed and the hand wheel is held closed the whole device may be transferred to the rising table or other device when, upon releasing the hand wheel, the spring will quickly open the molds until the lever 28 hits the stop 31, preferably with a blow sufficiently strong to cause all the molded units to drop immediately on to the table. Chains 31 from bolts 32 at the four corners of the carriage unite with a chain 33 which travels over overhead idlers 34—35, and is provided with a hand loop 36, which may, if desired, be hooked over a hook 37 on the carriage to hold the device in suspended position. The lift and drop of the carriage may be controlled by the hand loop 36 in the chain 33, of which a loop 37 may be provided to regulate the height which this machine may occupy.

I prefer to make the molds hemispherical, although any shape may be used, and I prefer that one mold shall have an under-cut rim 38, while the other has a projecting rim 39 to fit the under-cut rim of the other part.

In carrying out this invention, details of construction may be varied from those shown, and yet the essence of the invention be retained; some parts might be employed without others, and new features thereof might be combined with elements old in the art, in diverse ways, although the herein described type is regarded as embodying substantial improvements over such modifications.

As many changes could be made in the above construction, and many apparently widely different embodiments of the invention could be made without departing from the scope thereof, it is intended that all matter contained in the above description or shown in the accompanying drawings shall be interpreted in an illustrative and not in a limiting sense. It is furthermore desired to be understood that the language used in the following claims is intended to cover all the generic and specific features of the invention herein described, and all statements of the scope of the invention which as a matter of language might be said to fall therebetween.

By the term "molds" as used in the specification, I intend to use that term in a broad sense to cover any device which may be caused to penetrate into the dough to provide a pair of open jaws which may be closed, and lifted with a portion of the dough between their lower edges, and then opened at a later stage of operation to deposit the dough as has been described. It is not essential in all instances that the two parts shall be closed throughout when in contact one with the other, as it might be open-ended without in any way affecting the ability to grab the dough and retain it during the lift.

I claim as my invention:

1. In an apparatus of the character described in combination, a support for the dough, a plurality of cutting and lifting devices positioned thereover, each comprising a plurality of movable jaws and means adapted to open and close simultaneously a plurality of said devices.

2. In an apparatus of the character described in combination, a support for the dough, a frame positioned thereover, a plurality of cutting and lifting devices carried by said frame and movable relatively thereto, each of said devices comprising a plurality of cutting parts and a single means adapted to actuate said devices whereby they are carried into contact with the dough and cut and lift a portion thereof from the body of the dough.

3. In an apparatus of the character described in combination, a support for the dough, a frame, a plurality of cutting and lifting devices carried thereby and movable with respect to the frame, each of said devices comprising a pair of semi-spherical members hinged at their upper edges, means for moving said devices vertically with respect to the dough and means adapted to open and close a plurality of said devices.

4. The herein described device consisting of a carriage pivotally mounted two-part molds mounted thereon, means to operate the molds, rollers carried by the carriage and depending below the lower face of the molds, means for locking said rollers in said position, said rollers and supports when not locked in position being free to slide vertically to permit the drop of the molds below the rollers.

5. The herein described carriage, comprising parallel rails, parallel shafts at right angles to the rails, gears on said shafts adjacent to the rails, a number of gears in a given line being in mesh, depending connections from the rails downwardly, two-part molds carried on such connections, curved connecting links secured to the gears and to the molds.

6. The herein described carriage, comprising parallel rails, parallel shafts at right angles to the rails, gears on said shafts adjacent to the rails, a number of gears in a given line being in mesh, depending connections from the rails downwardly, two-part molds carried on such connections, curved connecting links secured to the gears and to the molds, and a single operating means for all the gears.

7. The herein described carriage, comprising parallel rails, parallel shafts at right angles to the rails, gears on said shafts adjacent to the rails, a number of gears in a given line being in mesh, depending connections from the rails downwardly, two-part molds carried on such connections, curved connecting links secured to the gears and to the molds, and a single operating means for the gears, a resilient means for returning a number of molds simultaneously to open position.

8. The herein described dough molding device consisting of a pair of pivoted molds, operating means for opening and closing said molds, consisting in part of a spring adapted to open the molds, and a stop adapted to limit the movement of the mold whereby the mold will be opened quickly, and with sufficient jar to enlarge the inclosed dough.

9. The herein described dough molding apparatus consisting of a two-part mold, adapted to be closed entirely, that the dough may be compressed within the mold, the parts mounted so as to be opened at their lower edge, and means to control the opening and shutting of the molds.

10. In a dough molding apparatus, in combination, a heavy support, means for carrying mold parts rigidly suspended from said support, in combination with the herein described dough molding apparatus, consisting of a two-part mold, each part mounted so as to open at its lower edge, means to cause said open mold-parts to penetrate dough beneath it, means to control the opening and shutting of the mold-parts.

11. In a dough molding apparatus, in combination, a heavy support, means for carying mold parts rigidly suspended from said support, in combination with the herein described dough molding apparatus, consisting of a two-part mold, each part mounted so as to open at its lower edge, means to cause said open mold-parts to penetrate dough beneath it, means to control the opening and shutting of the mold-parts in combination with a carriage supporting a plurality of such molds, and means for simultaneously operating a plurality of such molds.

12. In a dough molding apparatus, in combination, a heavy support, means for carrying mold-parts rigidly suspended from said support, in combination with the herein described device consisting of a carriage, two-part hemispherical molds, pivotally secured to the carriage, curved connecting links between a single gear and the two mold-parts, and means to operate the gear.

13. In a dough molding apparatus, in combination, a heavy support, means for carrying mold-parts rigidly suspended from said support, in combination with the herein described device consisting of a carriage, two-part hemispherical molds, pivotally secured to the carriage, curved connecting links between a single gear and the two-mold-parts, and means to operate the gear, a plurality of said gears, mold-parts and connecting rods, all gears connected with one another so as to turn simultaneously.

Signed at New York city, New York, this 25th day of March, one thousand nine hundred and thirteen.

MORRIS HAYMAN.

Witnesses:
T. D. DE WITT,
WM. J. FERNS, Jr.

Copies of this patent may be obtained for five cents each, by addressing the "Commissioner of Patents, Washington, D. C."